(12) United States Patent
Uchida et al.

(10) Patent No.: US 8,573,081 B2
(45) Date of Patent: Nov. 5, 2013

(54) SHAFT PART FORMED WITH A ROLLING GROOVE

(75) Inventors: Hiroyuki Uchida, Hiroshima (JP); Kenji Ouwa, Hiroshima (JP); Kazuho Mimura, Hiroshima (JP); Kazuhiko Yoshida, Iwata (JP)

(73) Assignee: NTN Corporation, Osaka-shi (JP)

(*) Notice: Subject to any disclaimer, the term of this patent is extended or adjusted under 35 U.S.C. 154(b) by 0 days.

(21) Appl. No.: 13/278,208

(22) Filed: Oct. 21, 2011

(65) Prior Publication Data

US 2012/0031211 A1 Feb. 9, 2012

Related U.S. Application Data

(63) Continuation of application No. PCT/JP2010/057088, filed on Apr. 21, 2010.

(30) Foreign Application Priority Data

Apr. 23, 2009 (JP) ................................ 2009-104650

(51) Int. Cl.
    *F16H 25/22* (2006.01)
(52) U.S. Cl.
    USPC ........................ 74/89.23; 148/574; 148/575
(58) Field of Classification Search
    USPC .................. 74/89–89.19; 29/898.04, 898.06, 29/898.13; 148/567–575; 384/625, 913, 384/492; 470/10
    See application file for complete search history.

(56) References Cited

U.S. PATENT DOCUMENTS

| 5,411,612 | A  | * | 5/1995 | Shapona ........................ 148/567 |
| 5,803,993 | A  | * | 9/1998 | Yoshida et al. ............... 148/320 |
| 6,602,358 | B1 | * | 8/2003 | Ochi et al. .................... 148/328 |
| 2007/0137350 | A1 | * | 6/2007 | Tateishi et al. ............. 74/424.87 |
| 2007/0187004 | A1 | * | 8/2007 | Hirai et al. .................... 148/337 |
| 2007/0201783 | A1 | * | 8/2007 | Hirai et al. .................... 384/544 |
| 2009/0110589 | A1 | * | 4/2009 | Usui et al. ..................... 420/106 |

FOREIGN PATENT DOCUMENTS

| JP | 63-011623 | | 1/1988 |
| JP | 02-298213 | | 12/1990 |
| JP | 05-001320 | | 1/1993 |
| JP | 05-202414 | | 8/1993 |
| JP | 2000-080446 | | 3/2000 |
| JP | 2000-282136 | | 10/2000 |
| JP | 2000282136 | * | 10/2000 |
| JP | 2002-129231 | | 5/2002 |
| JP | 2003-025152 | | 1/2003 |
| JP | 2003-119518 | | 4/2003 |
| JP | 2004-232669 | | 8/2004 |
| JP | 2005-299720 | | 10/2005 |
| JP | 2006-233288 | | 9/2006 |
| JP | 2006233288 A | * | 9/2006 |
| JP | 2007-002669 | | 1/2007 |
| JP | 2007-239068 | | 9/2007 |
| JP | 4226052 | | 2/2009 |

* cited by examiner

*Primary Examiner* — Troy Chambers
*Assistant Examiner* — Valentin Craciun
(74) *Attorney, Agent, or Firm* — Harness, Dickey & Pierce, P.L.C.

(57) ABSTRACT

A shaft part is formed with a rolling groove (5) on which rolling elements (4) roll. At least the rolling groove (5) is induction hardened with no generation of black colored oxidized scale after the induction hardening. A surface of the induction hardened rolling groove (5) is used "as is" as a rolling surface. The surface roughness Ra of the induction hardened surface "as is" of the rolling groove (5) is less than 1.0. The ratio of effective hardened depth of a hardened layer is between 0.15 and 0.45.

13 Claims, 4 Drawing Sheets

SHAFT PART FORMED WITH A ROLLING GROOVE

CROSS-REFERENCE TO RELATED APPLICATIONS

This application is a continuation of International Application No. PCT/JP2010/057088, filed Apr. 21, 2010, which claims priority to Japanese Application No. 2009-104650, filed Apr. 23, 2009. The disclosures of the above applications are incorporated herein by reference.

FIELD

The present disclosure relates to a shaft part, formed with a rolling groove, for a linear motion mechanism, such as a ball screw etc., used in a power transmitting apparatus of an automobile or industrial machine and in transferring apparatus and, more particularly, to a shaft part formed with a rolling groove where the rolling groove is locally hardened by induction heating.

BACKGROUND

The ball screw is a mechanical element including a plurality of balls arranged between a first rolling groove, formed on the outer circumferential surface of a screw shaft, and a second rolling groove, formed on the inner circumferential surface of a nut externally fit on the screw shaft. The ball screw coverts the rotational power of the screw shaft (or the nut) to a linear power of the nut (or the screw shaft) via the balls. The rolling groove surface of the screw shaft is hardened to improve wear resistance and durability. There are various methods as follows for manufacturing the screw shaft of the ball screw where the hardening is performed by induction hardening.

One of them is a method for manufacturing a screw shaft of a ball screw disclosed in Patent Document 1, listed below, where the rolling groove surface is induction hardened to have a hardness of HRC 55-62 to improve the wear resistance after formation of the rolling groove of the screw shaft is rolled from a blank of middle carbon steel. The screw shaft goes through a buffing process to remove oxidized scale generated by the induction heat treatment. Finally, the screw shaft is straightened to correct deformation of the screw shaft generated during the rolling process and induction hardening process.

Another method of manufacturing a nut screw of a ball screw is disclosed in Patent Document 2, listed below, where oxidized scale is removed from the rolling groove. The rolling groove is finished by performing an electropolishing step on the rolling groove after induction hardening of the rolling groove of the nut screw.

However, in the methods disclosed in Patent Documents 1 and 2, it is an indispensable step to remove the oxidized scale after the induction hardening. This is due to the presence of the oxidized scale on the surface of the rolling groove which causes wear or noise during operation of the ball screw.

Patent Document 3, listed below, discloses a method for removing oxidized scale. However, it is not limited to a method for manufacturing a ball screw. The method is carried out by increasing pressure of cooling water during the induction hardening.

It is required, in the screw shaft of the ball screw, to reduce deflection of the screw shaft after heat treatment as small as possible to prevent the generation of vibration. A plurality of methods have been proposed in the prior art to perform the induction hardening in oil to reduce deformation of the screw shaft after heat treatment and to prevent the generation of oxidized scale. The hardening in oil remarkably reduces the deflection of the screw shaft accompanied with the induction hardening since the screw shaft is uniformly cooled by the oil as a coolant.

In one method of induction hardening in oil, a stationary induction hardening is conducted where the hardening is carried out without causing any relative movement between an induction hardening coil and an article to be hardened. As disclosed in Patent Documents 4 through 6, listed below, there are two methods for stationary induction hardening. In one, both heating and cooling are performed in liquid. In the other, heating is performed in gas and then cooling is performed in a coolant.

Patent Document 4 discloses an induction hardening method where dissolved oxygen in the quenching oil is first removed by performing bubbling of the quenching oil with inert gases, such as nitrogen or argon. The surface of the metallic member is induction hardened in the quenching oil. The metallic member is immediately cooled in the quenching oil to perform the hardening treatment. Thus, the generation of oxidized scale can be prevented by performing cooling while injecting the quenching oil from a cooling jacket using the quenching oil where the dissolved oxygen is removed as much as possible.

Similar to Patent Document 4, where heating and cooling of a metallic member are performed in the quenching oil, in Patent Document 5, the surface of the metallic member, after heating, is cooled by pouring the quenching oil into an oil tank using a cooling nozzle and agitating it.

Patent Document 6 discloses a hardening method where a metallic part is induction hardened in a casing filled with non-oxidizing gas or reducing gas. It is hardened by quickly cooling the metallic part by dipping it into a coolant.

Patent Document 7 discloses a mechanical part, such as a screw shaft of a ball screw with a rolling groove, and its manufacturing method of submerged induction hardening which does not cause black colored oxidized scale.

On the other hand, several devices have been proposed not relating to the induction hardening and adapted to prevent oxidization of a mechanical part to be hardened even in heat treatment using a furnace. Patent Document 8 is one representative example. Patent Document 8 discloses an oil hardening apparatus able to transfer deoxidized quenching oil in a decompressed oil tank equipped, with a vacuum pump, into a quenching oil tank.

Patent Document 9 discloses a continuous annealing apparatus equipped with a formation and degassing apparatus to reduce the concentration of oxygen in the atmosphere within a cooling tank as well as the concentration of dissolved oxygen in the coolant.

Patent Document 1: Japanese Laid-open Patent Publication No. 119518/2003
Patent Document 2: Japanese Laid-open Patent Publication No. 25152/2003
Patent Document 3: Japanese Laid-open Patent Publication No. 129231/2002
Patent Document 4: Japanese Laid-open Patent Publication No. 298213/1990
Patent Document 5: Japanese Laid-open Patent Publication No. 282136/2000
Patent Document 6: Japanese Laid-open Patent Publication No. 1320/1993
Patent Document 7: Japanese Laid-open Patent Publication No. 233288/2006

Patent Document 8: Japanese Laid-open Patent Publication No. 202414/1993

Patent Document 9: Japanese Laid-open Patent Publication No. 11623/1988

In a mechanical part, such as a ball screw, where spherical rolling elements are present, the rolling elements roll in a point-contacting condition (near pure contacting condition). Accordingly, noise would be caused by abrupt change of motion of the rolling elements if foreign matter, such as oxidized scale generated during hardening of the mechanical part, is present on the surface of the rolling groove or bitten therein. Thus, it is an indispensable step for manufacturing a mechanical part, such as ball screw, to remove the oxidized scale.

Oxidized scale is not sufficiently removed from the rolling groove only by the buffing process disclosed in Patent Document 1. An additional problem of the buffing process is that it requires a long processing time and thus increases the manufacturing cost.

Oxidized scale will be perfectly removed from the rolling groove by the electropolishing of the rolling groove after its induction hardening as disclosed in Patent Document 2. However, it has the problems that it requires a long processing time as well as it causes roughness on the surface of rolling groove and softening of the surface layer of the rolling groove due to the chemically reacting heat. In addition, there are problems of treating waste polishing liquid, building facilities and working circumstances which increase costs.

In case of the method for removing oxidized scale disclosed in Patent Document 3, using high pressure cooling water during induction hardening, uniform removal of scale cannot be achieved. Thus, the dotted black scale remains. Accordingly, other scale removing steps, such as a buffing step, is required.

When a deformed ball screw is applied to a transfer apparatus, run-out or vibration will be caused during a high speed rotation of the ball screw. Thus, it is necessary to prevent the generation of oxidized scale after heat treatment as well as to reduce the deformation of the ball screw using a method of induction hardening in oil as disclosed in Patent Documents 4-7.

However since methods of Patent Documents 4 and 5 use quenching oil, with dissolved oxygen removed by an inert gas, it increases the hardening cost due to the use of expensive inert gas.

Also, there is a problem that it is difficult to provide articles of uniform quality of less oxidized scale since it is difficult to control the content amount of oxygen in the quenching oil by the inert gas. Thus, it is difficult to have oxygen-free quenching oil. Accordingly, additional processes, such as shot blasting etc., are required to remove oxidized scale. Thus, irregular surfaces are formed on the articles by shot blasting.

In the method of Patent Document 6, non-oxidizing gas or reducing gas is filled in a casing. Thus, it is necessary to use expensive inert gas. This increases the cost for hardening. In addition, it is also a problem that gas replacement of the casing should be performed. Accordingly, productivity is diminished.

Furthermore, Patent Documents 4-6, stationary induction hardening is conducted where the relative position between a heating coil and an article to be hardened is not changed. Thus, it is a problem that the coil should be fit to the configuration of the article to be hardened. This increases the manufacturing cost.

Patent Document 7 discloses a method of induction hardening in oil a ball screw. It proposes a mechanical part, with a rolling groove, induction hardened in oil without the generating black colored oxidized scale and a method of manufacturing.

Although it is described in Patent Document 7, that the non-oxidizing condition can be achieved, due to the hardening performed in oil containing little oxygen, it is clear as mentioned in Patent Documents 5, 6 and 8 that dissolved oxygen present in the oil will generate oxidized scale. Patent Document 7 does not refer to any method to prevent or remove the dissolved oxygen. Thus, further improvement is required.

Patent Documents 8 and 9 disclose preventing the generation of oxidized scale due to heat in a furnace. The furnace heating requires a long treating time and thus synchronization of the manufacturing line becomes difficult. Accordingly, there is a problem that deformation of the article is increased due to it being held at a high temperature for a long period of time.

Accordingly, there is an occasion where large deflection of an article, caused in the induction hardening step, could never be corrected to necessary dimensions in a later deflection correcting step. Accordingly, it is important to reduce the deflection as small as possible in a later induction hardening step.

SUMMARY

It is, therefore, an object of the present disclosure to provide a shaft part formed with a rolling groove where the generation of deflection can be reduced, the surface of the induction hardened rolling groove can be used as is, and the productivity and manufacturing cost can be improved without fully preventing the generation of oxidized scale after induction hardening. An extremely thin oxidized scale remains on the surface so that it has high adhesion. Thus, noise is not caused even if the scale would flake off from the surface of the rolling groove during running of the shaft part.

To achieve the object of the present disclosure, a shaft part is provided with a rolling groove on which rolling elements roll. At least the rolling groove is induction hardened and has no generation of black colored oxidized scale after the induction hardening. A surface of the induction hardened rolling groove is used as is as a rolling surface. The surface roughness Ra of the induction hardened surface, as is on of the rolling groove, is less than 1.0. Additionally, the ratio of effective hardened depth of a hardened layer is 0.15 or more and 0.45 or less.

Abnormal noise will be generated when the surface roughness Ra (arithmetic average roughness) exceeds 1.0. This is the case even though worsening of the surface roughness is suppressed by thinning oxidized scale after induction hardening, to a degree, so that the oxidized scale does not now have a black color. It is supposed that the generation of abnormal noise is prevented since oxidized scale of less than Ra 1.0 has a strong adhesion to the base metal and it is extremely thin once it flakes from the base metal.

Usually, in the induction hardening, heating is performed in the atmosphere and then cooled. The heating temperature is high, such as 900-1150° C., and thus thick and brittle oxidized scale is generated with the metal of an article reacting with oxygen in the atmosphere or dissolved oxygen in the cooling water. Accordingly, thick oxidized scale is formed on the rolling groove of the shaft part, such as a screw shaft, when induction hardening is applied to the rolling groove. According to a test conducted by the present inventors, it has been found that the thick oxidized scale has small adhesiveness and becomes a cause of generating the abnormal noise. However, if trying to have a perfectly non-oxidized condition, it is necessary to use major equipment as described in Patent Documents 4-6 and the productivity of the screw shaft will also be reduced. The present inventors have studied the relationship between surface roughness after induction hardening and the abnormal noise. They have found that the generation of abnormal noise can be prevented by properly controlling the surface roughness within the range described above. As the result of which the shaft part, formed with a rolling groove, can be manufactured at high productivity and low manufacturing cost without using major equipment.

In addition the surface roughness has a close relationship with the temperature of the induction hardening. When the ratio of effective hardened depth (i.e. depth of an effective hardened layer/a radius of a shaft) is less than 0.15, it is possible to maintain a low heating temperature of the induction hardening surface of an article. Accordingly, although it is advantageous to have a thin oxidized scale and to suppress deterioration of the surface roughness, the rolling life will be extremely reduced. A high surface pressure is applied to the rolling groove by balls at contacting points between the balls and the surface of the rolling groove. The maximum stress is caused at a point inside the screw shaft rather than the surface of rolling groove. Accordingly, the lower limit of the effective hardened depth is usually set at a point deeper than the point at which the maximum stress is caused. The upper limit of the ratio of the effective hardened depth is set at 0.45. Thus, since the temperature of induction hardening is increased, the surface roughness deteriorates due to the generation of porous oxidized scale. Also, the deflection of the screw shaft is increased due to an increase of the degree of cooling. The range of the ratio of effective hardened depth is preferably 0.2-0.38.

In consideration of the ratio of effective hardened depth and the productivity, the range of the surface roughness is preferably Ra 0.1-0.6.

The present inventors have studied the relationship between the surface roughness and the abnormal noise and the relationship between the thickness of oxidized scale and found that the generation of abnormal noise can be prevented by properly controlling the surface roughness within a moderate range described above. As the result of which the shaft part, formed with a rolling groove, can be manufactured in high productivity and low manufacturing cost without using major equipment.

The rolling groove has a circular arc cross-section. The rolling elements may be balls. Balls can achieve smooth motion.

The shaft part may be a screw shaft of a ball screw. In such a case it is possible to prevent the generation of abnormal noise during operation of the ball screw.

The screw shaft may be one with a rolling groove formed by a rolling process. The rolling process is advantageous in the surface roughness since no machining trace, such as turning trace, is formed on the surface of the rolling groove. Thus, it is possible to manufacture the screw shaft at a high productivity and a low cost by using the rolling process which can eliminate the scale removing step after the induction hardening.

The heat softening treatment is performed just before premachining of the rolling groove in order to reduce deformation resistance in the rolling process. This is because the deformation after heat treatment can be increased by performing the heat softening treatment just before the rolling process. It is believed that dimensional variation after the induction hardening is increased since the carbon concentration of the surface layer of an article becomes uneven due to the variation of the carbon concentration in the treatment atmosphere although it is controlled to prevent decarbonization of the article. The heat softening treatment in the present disclosure is not limited to a particular kind although there are various kinds of heat softening treatments such as perfect annealing, spheroidizing annealing. It is preferable to perform the heat treatment in a furnace where the atmosphere is controlled to suppress decarbonization, carbonization and nitriding of an article.

It is preferable that the specific deflection amount (deflection amount/overall length) of the shaft deflection at its center is $1.05 \times 10^{-3}$ (TIR/mm) or less after the induction hardening and $0.6 \times 10^{-3}$ (TIR/mm) or less after the straightening. If the specific deflection amount exceeds $0.6 \times 10^{-3}$ (TIR/mm) after straightening, vibration during operation of the screw shaft will be increased and cause premature breakage and abnormal noise. In addition if the specific deflection amount after the induction hardening before the straightening exceeds $1.05 \times 10^{-3}$ (TIR/mm), the straightening within a determined amount cannot be expected.

Furthermore, it is preferable that the outer diameter of the rolling groove portion forms the outermost diameter of the shaft part and the outermost diameter of the shaft part is within a range of $\phi 10$-$\phi 28$. By configuring the rolling groove portion so that it forms the outermost diameter of the shaft part, the effective heating at the heating portion during induction hardening and improvement in productivity can be achieved. If the outermost diameter of the shaft part is less than $\phi 10$, the rigidity of the shaft part is reduced. Thus, deformation during machining and rolling is increased. This makes it difficult to manufacture the shaft part. On the other hand, if the outermost diameter of the shaft part exceeds $\phi 28$, the heating efficiency in the oil is reduced. Accordingly the heating temperature may be high, thick oxidized scale is generated and deflection of the shaft part is extremely increased. If it is desired to form thinner scale, it is necessary to reduce the heating temperature and thus the necessary hardened depth cannot be obtained.

It is preferable that blank of the shaft part is carbon steel including carbon content of 0.47-0.6 wt % and has a surface hardness of HRC 46-64 on the rolling groove after the induction hardening. If the carbon content is less than 0.47 wt %, it is necessary to increase the heating temperature to a high temperature to obtain a necessary hardened depth and hardness. Thus, it becomes impossible to keep a necessary surface roughness. On the other hand, when the carbon content exceeds 0.6 wt %, the machining ability is extremely reduced. Thus, the sensitivity to hardening cracks would be extremely increased. Preferable carbon content is within a range of 0.49-0.56 wt %.

As to the blank, it is preferable that it includes Si of 0.02-0.1 wt %, Cr of 0.02-0.05 wt %, B of 0.0003-0.006 wt %, and the remainder of Fe and unavoidable impurities.

The surface roughness is improved by optimizing the contents of Si and Cr which are alloying elements liable to form oxides to suppress the generation of oxidized scale after induction hardening. Si is added as a deoxidizer and if its content is less than 0.02 wt %, a sufficient deoxidizing effect can not be obtained. On the other hand if it exceeds 0.1 wt %, the thickness of scale membrane and accordingly the surface roughness would be increased. Thus, the rolling ability would be decreased. The content of Cr is preferable as small as possible. However its upper limit is set less than 0.05 wt % since it is inevitably mingled in the steel making step. Similar to Si, decrease of Cr improves the machining ability. Elements Si and Cr improve induction hardening ability. Reduction of Si and Cr is supplemented by adding B of 0.0003-

0.006 wt %. If the amount of supplemental B is less than 0.0003 wt %, little effect is found in improvement of hardening. On the other hand if the amount of supplemental B exceeds 0.006 wt %, coarsening of crystal grains is generated and thus the sensitivity of hardening cracks is promoted. The amount of addition of B is preferably 0.0004-0.005 wt %.

It is preferable that the old austenite grain size of the surface of rolling groove after the induction hardening is #8-11. If the old austenite grain size of the surface of rolling groove after the induction hardening is lower than #8, the oxidized scale would be extremely increased, the surface roughness would also be extremely worsened and thus the deflection of the shaft would be increased. On the other hand, if the old austenite grain size of the surface of rolling groove after the induction hardening is higher than #11, the effective hardened depth would be reduced.

It is possible that both ends of the shaft part are incorporated with ball bearings. This provides a mechanical device with a low friction.

It is also possible that both ends of the shaft part are incorporated with needle bearings. This provides a mechanical device with a compact size and an extreme increase in loading capacity.

It is preferable that at least the surface of the rolling groove is moving induction hardened in oil. This prevents the worsening of the surface roughness.

A shaft part is formed with a rolling groove where at least the rolling groove is induction hardened and it has no generation of black colored oxidized scale after the induction hardening. A surface of the induction hardened rolling groove is used as is, as a rolling surface. The surface roughness Ra of the induction hardened surface as is, of the rolling groove, is less than 1.0. The ratio of effective hardened depth of a hardened layer is 0.15 or more and 0.45 or less. Accordingly, it is possible to provide a shaft part, formed with a rolling groove, that can prevent the generation of abnormal noise and can be manufactured at high productivity at low cost without requiring major equipment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A shaft part is formed with a rolling groove on which rolling elements roll. At least the rolling groove is induction hardened and has no generation of black colored oxidized scale after the induction hardening. A surface of the induction hardened rolling groove is used as is as a rolling surface. The surface roughness Ra of the induction hardened surface as is of the rolling groove is less than 1.0 and the ratio of effective hardened depth of a hardened layer is 0.15 or more and 0.45 or less.

One preferred embodiments of the present disclosure will be described in detail with reference to the accompanying drawings.

Figure 1:
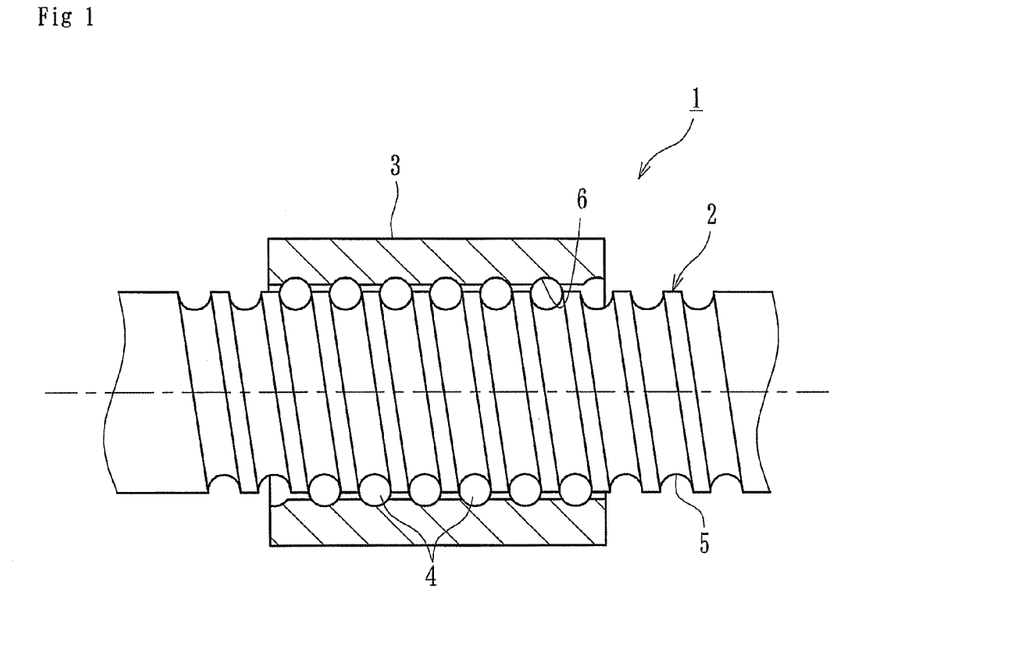
FIG. 1 is a longitudinal sectional view of a ball screw with a screw shaft.
Figure 2:
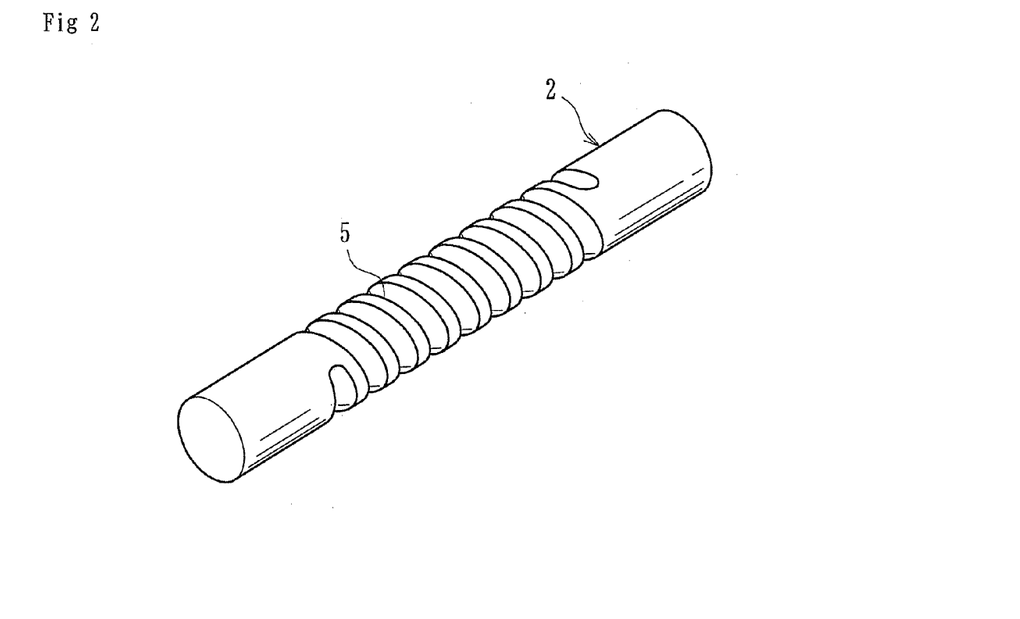
FIG. 2 is a perspective view of the screw shaft of FIG. 1.
Figure 3:
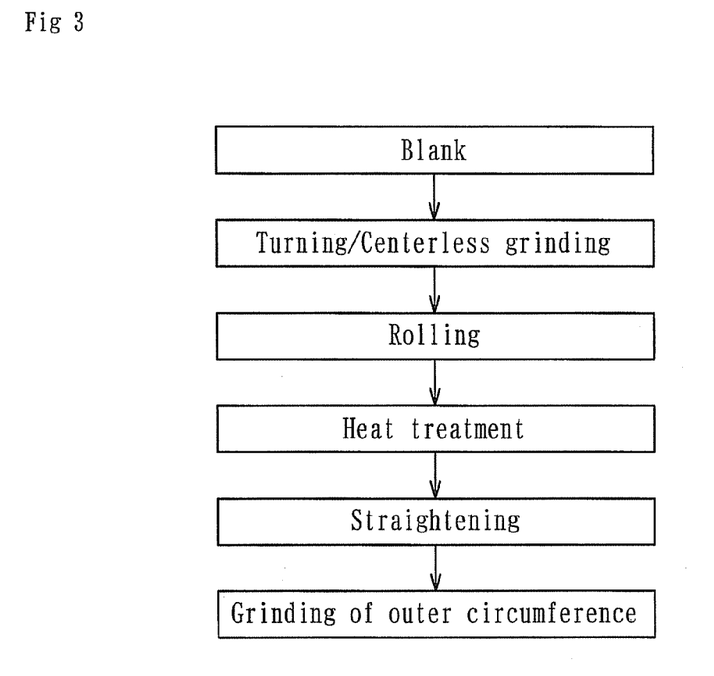
FIG. 3 is a flow chart showing steps of manufacturing the screw shaft of FIG. 1.
Figure 4:
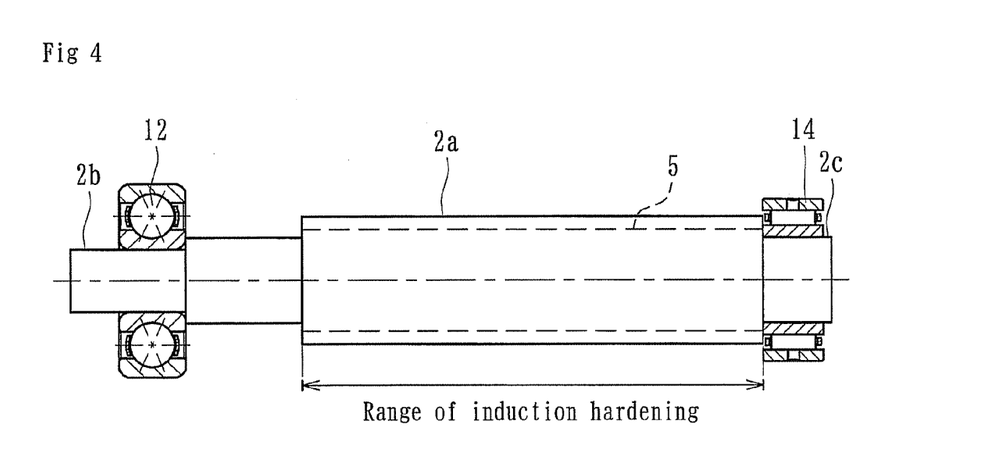
FIG. 4 is a schematic view showing a range of induction hardening of the screw shaft of FIG. 1.
Figure 5:
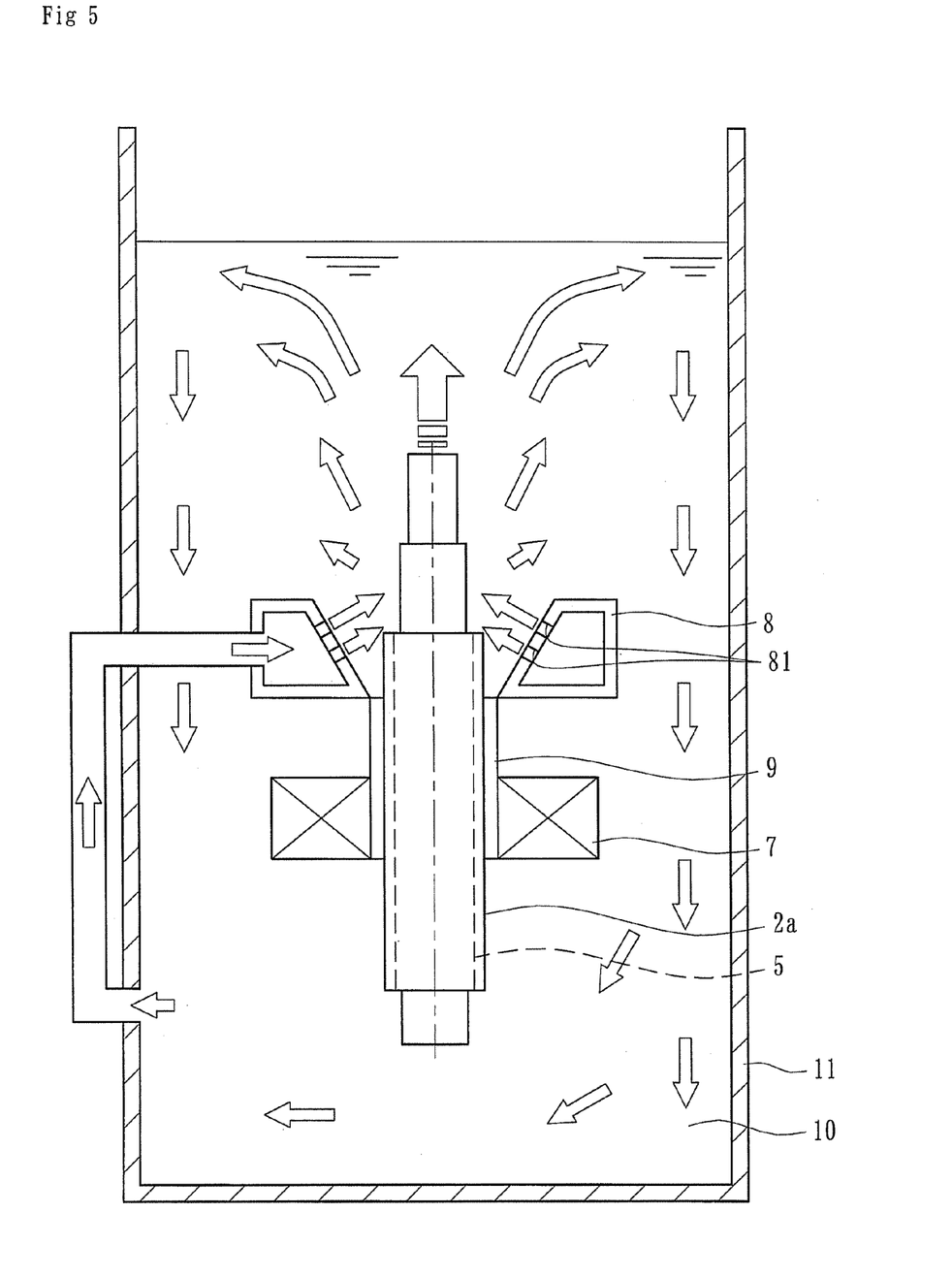
FIG. 5 is a sectional view showing a condition of induction hardening in oil of the screw shaft of FIG. 1.

The shaft part, formed with a rolling groove, of the present disclosure will be described with respect to an example applied to a screw shaft of a ball screw. FIG. 1 is a longitudinal sectional view of a ball screw with a screw shaft. FIG. 2 is a perspective view of the screw shaft of FIG. 1. FIG. 3 is a flow chart showing steps of manufacturing the screw shaft of FIG. 1. FIG. 4 is an explanatory schematic view showing a range of induction hardening (hardening) of the screw shaft of FIG. 1. FIG. 5 is an explanatory vertical sectional view showing a condition of induction hardening in oil of the screw shaft of FIG. 1.

As shown by the longitudinal section view of FIG. 1, a ball screw 1 includes a screw shaft 2, a nut 3 and a plurality of balls 4, which act as the rolling elements. As shown in FIG. 2, the screw shaft 2, forming the shaft part with a rolling groove, is a shaft formed with a spiral rolling groove 5. The groove 5 has a circular arc cross section on which balls 4 roll. The term "circular arc cross section" used herein includes a Gothic arch configuration which is a combination of two circular arcs having different centers of the circular arcs.

A nut 3 is adapted to be loosely fit onto the screw shaft 2. The nut 3 is formed on its inner circumference with a spiral rolling groove 6. The groove 6 has a circular arc cross section on which the balls 4 roll. The balls 4 are arranged between the opposite rolling grooves 5 and 6 of the screw shaft 2 and the nut 3. The nut 3 is mounted with a circulating member (not shown), such as a bridge member or a return tube to create an endless track between the opposite rolling grooves 5 and 6 and endless-circulating of the balls 4.

At least the rolling groove 5 is induction hardened and has no generation of black colored oxidized scale after the induction hardening. A surface of the induction hardened rolling groove 5 is used as is as a rolling surface. The surface roughness Ra of the induction hardened surface as is, of the rolling groove 5, is less than 1.0, preferably 0.1-0.6. The ratio of effective hardened depth of a hardened layer is 0.15 or more and 0.45 or less, preferably 0.2-0.38.

The screw shaft 2 is manufactured in accordance with steps schematically shown in FIG. 3.

A coiled member or a round bar member is used as a blank. The blank is turned to have a predetermined configuration. It is centerless ground to have a desired outer diameter and remove surface flaws to finish the outer circumference. The finished round bar member is rolling processed to form the rolling groove 5, which is performed by a cold rolling. The rolling is performed by forcedly contacting a rolling roll (not shown) onto the outer circumference of the round bar member.

The heat softening treatment is performed appropriately just before pre-machining of the rolling to reduce the deforming resistance during the rolling process. The heat softening treatment is not limited to a particular kind. There are various kinds of heat softening treatments such as perfect annealing, spheroidizing annealing. It is preferable to perform the heat treatment in a furnace with a controlled atmosphere controlled to suppress decarbonization, carbonization and nitriding of an article.

The moving induction hardening in oil, straightening and grinding of the outer circumference for a final finish are performed. In some cases the straightening process and the final grinding process may be omitted.

As shown in FIG. 4, the outer diameter of the rolling groove portion 2a in which the rolling groove 5 is formed, corresponds to the outermost diameter of the shaft part. The range of the induction hardening is only in the rolling groove portion 2a. Both ends 2b and 2c, of smaller diameter of the shaft part, are incorporated with a ball bearing 13 and/or a needle bearing 14. It is possible to achieve efficient heating at the rolling groove portion 2a and improve productivity during the moving induction hardening by setting the outer circumference of the rolling groove portion 2a as the maximum diameter.

FIG. 5 schematically shows the moving induction hardening in oil.

The hardening can be performed using an induction heating apparatus at a frequency of 100 kHz and a power of 100 kW. In the method of moving induction hardening in oil, the hardening is performed by a step of partially heating the screw shaft 2 by an induction heating coil 7 in quenching oil 10 contained in a oil tank 11. The heated portion of the screw shaft 2 is cooled by an injection or convection step (shown in FIG. 5 by arrows) of the quenching oil 10. A current flowing through the induction heating coil 7 causes an induction current on the surface of the screw shaft 2. Thus, the surface of the screw shaft 2 can be rapidly heated.

Heat generated by the induction heating causes heat decomposition of the quenching oil around the screw shaft 2. Thus, heat decomposed gas 9 (schematically shown in FIG. 5) is generated from the quenching oil 10. Accordingly, the vapor pressure of the heat decomposed gas 9 and the oil pressure of the quenching oil 10 are balanced and the gas accumulates on the outer circumference of the screw shaft 2 in a membrane-like state. Thus, the whole heated portion of the screw shaft 2 is completely covered by the heat decomposed gas 9. Accordingly, the screw shaft 2 can be prevented from contacting with the quenching oil 10.

The heat decomposed gas 9 is generally generated when the quenching oil 10 is heated to a temperature of about 700° C. or more. The heat decomposed gas 9 components, depending upon the kind of quenching oil, are generally carbon monoxide, hydrogen, nitrogen, methane, ethane, ethylene, propane etc. Since the heat decomposed gas 9 contains little oxygen, it is possible to obtain a desirable oxygen-free atmosphere. In addition, since the whole heating portion of the screw shaft 2 is completely covered by the heat decomposed gas 9 and the screw shaft 2 is prevented from contacting the quenching oil 10, an oxidizing reaction of the screw shaft 2 is not substantially caused.

It is possible to use as quenching oil 10 commercially available mineral heat treatment oil, such as oils for cold hardening and hot hardening. Since principal component of the quenching oil, is hydrocarbons, gasses described above will be generated when the quenching oil is decomposed.

The heat decomposed gas 9 is endlessly generated so long as the screw shaft 2 is kept in a high temperature condition. Thus, the entire heated portion can always be covered by immediately generated decomposed gas 9 until it is cooled if one portion of the screw shaft 2 would be exposed.

The heated screw shaft 2 is cooled by injecting the quenching oil 10 toward the screw shaft 2. The quenching oil 10 is injected toward a direction opposite to the induction heating coil 7. The quenching oil 10 is not injected toward the heating side (i.e. the induction heating coil 7). Thus, it is possible to prevent the heat decomposed gas 9 covering the outer circumference of the screw shaft 2, in the heating step, from being separated from it.

Accordingly, contact between the quenching oil 10 and the surface of the screw shaft 2, to be hardened, can be prevented by the heat decomposed gas 9 generated in the heating step and covering the surface of the screw shaft 2 from the time of heating to that of cooling. Although the heat decomposed gas 9 is separated from the outer surface of the screw shaft 2 by injection of the quenching oil 10 in the cooling step, there is not sufficient time for an oxidizing reaction even if the surface of the screw shaft 2 is contacted with dissolved oxygen in the quenching oil 10 since the screw shaft 2 is rapidly cooled and its temperature is also rapidly reduced. Thus, the oxidizing reaction between the dissolved oxygen and the screw shaft 2 can be prevented and the generation of black colored oxidized scale on the heated surface of the screw shaft 2 can also be prevented.

The quenching oil 10 is injected via injecting apertures 81 of cooling jacket 8. The cooling jacket 8 is arranged above the induction heating coil 7. The screw shaft 2 is moved upward so as to be heated and then cooled with passing in order through the induction heating coil 7 and the cooling jacket 8. In addition, the screw shaft 2 is moved upward while being rotated in order to achieve uniform heating and cooling. The heat decomposed gas 9 tends to be separated from the surface of screw shaft 2 by its buoyancy. However, this tendency can be suppressed by performing the hardening while, moving the screw shaft 2 upward so as to coincide the moving direction of the screw shaft 2 with the direction of buoyancy acting on the heat decomposed gas 9. Accordingly, "bright treatment" of the screw shaft 2 can be achieved by effectively utilizing the heat decomposed gas 9 without using any inert gas. The term "bright treatment" used herein means that the black colored oxidized scale is not generated on the surface of the screw shaft 2. On the other hand extremely thin oxidized scale will be generated on the surface of the screw shaft 2 since minor oxygen is contained in the quenching oil 10.

The extremely thin oxidized scale has a strong adhering ability. It is difficult for the thin oxidized scale to flake from a base metal. However, abnormal noise would be caused if the surface roughness exceeds Ra 1.0. Oxidized scale having the surface roughness less than Ra 1.0 has a strong adhesion with the metal base and the generation of abnormal noise cannot be found since the scale is extremely thin. In addition, the surface roughness has an intimate relation with the induction heating temperature. When the ratio of effective hardened depth is less than 0.15, it is possible to keep a low heating temperature on the surface of an article at the time of induction hardening. Accordingly, it advantageously acts to have a thin oxidized scale and to suppress deterioration of the surface roughness; however, it substantially reduces the rolling life of the rolling groove. A high pressing force is applied to contacting points by a load acting from the balls to the surface of the rolling groove. Thus, a pressing stress is distributed across a cross section at the contacting portion. A maximum stress is caused at an inner point from the surface. Usually, a lower limit of the effective hardened depth is set at a point deeper than that where the maximum stress is caused. The upper limit of the ratio of effective hardened depth is set at 0.45. The temperature in the induction heating step is increased when it exceeds 0.45. Thus, porous oxidized scale is generated and the surface roughness is worsened. The deflection of the article is increased with an increase of the degree of cooling. It is preferable to set the ratio of effective hardened depth at a range of 0.2-0.38. It is also preferable to set the surface roughness at a range of Ra 0.1-0.6 in consideration of the ratio of effective hardened depth and productivity of the article.

Figure 6:
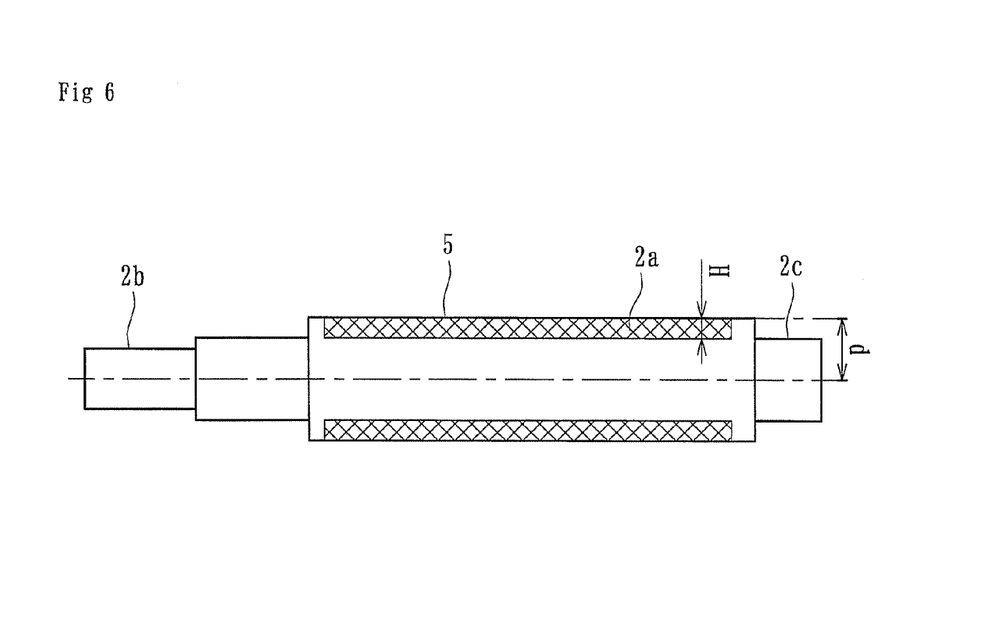
FIG. 6 is a schematic view showing the ratio of effective hardened ratio after induction hardening of the screw shaft of FIG. 1.

FIG. 6 is an explanatory drawing of the ratio of effective hardened depth after the induction hardening of the screw shaft. The ratio of effective hardened depth is defined as "a depth H of effective hardened layer/a radius d of the screw shaft" as shown in FIG. 6. The range of induction hardening may be the entire rolling groove portion as shown in FIG. 4 or it may be limited to a necessary portion (hatched portion) as shown in FIG. 6.

According to the present disclosure, the screw shaft 2 is hardened in the quenching oil 10. The quenching oil 10 acts as a cooling liquid and the entire screw shaft 2 is uniformly cooled. Thus, it is possible to substantially reduce the deflection of the screw shaft 2 associated with the induction hardening.

It is preferable that the specific deflection amount (deflection amount/overall length) of shaft deflection is $1.05 \times 10^{-3}$ (TIR/mm) or less after the induction hardening and $0.6 \times 10^{-3}$ (TIR/mm) or less after straightening. Vibration during operation of the screw shaft 2 will be increased and premature breakage or abnormal noise will occur if the specific deflection amount of shaft after straightening exceeds $0.6 \times 10^{-3}$ (TIR/mm). On the other hand, it will be impossible to correct the deflection of the screw shaft 2 within a predetermined amount by the straightening process if the specific deflection amount exceeds $1.05 \times 10^{-3}$ (TIR/mm) before straightening and after induction hardening.

Figure 7:
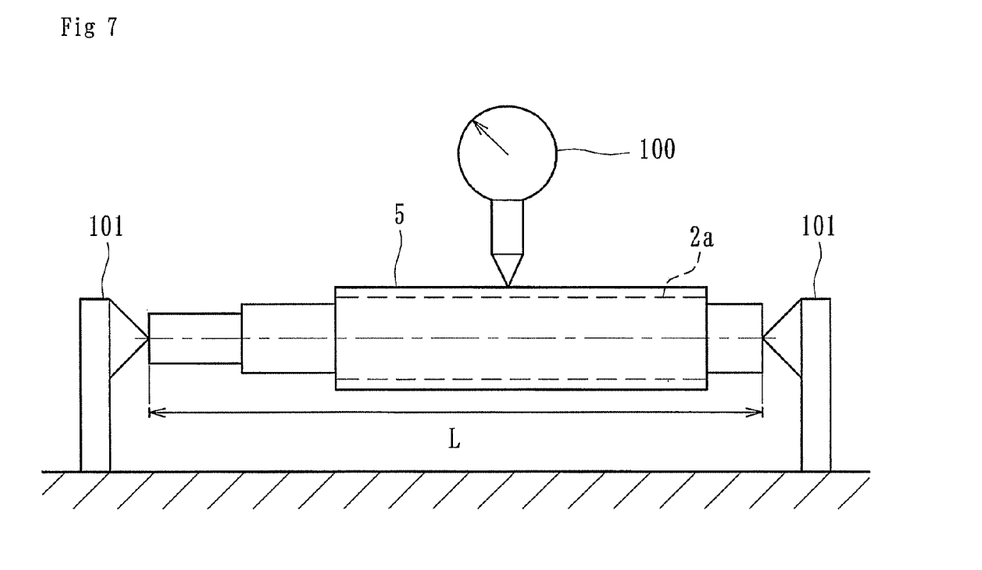
FIG. 7 is a schematic view showing a method for measuring the deflection of the screw shaft of FIG. 1.

FIG. 7 shows a measuring method of the specific deflection amount of the shaft. Both ends of the screw shaft 2 are rotatably supported by supporting pins 101 and 101. The specific deflection amount of the screw shaft 2 at the center is measured by a dial gauge 100. A ratio of the deflection amount to the whole length L is calculated.

It is preferable that a blank of the shaft part is carbon steel including carbon content of 0.47-0.6 wt % with a surface hardness of HRC 46-64 of the rolling groove 5 after the induction hardening. If the carbon content of the blank is less than 0.47 wt %, it is necessary to have a high heating temperature in order to obtain the necessary hardened depth and hardness. Thus, the oxidized scale is increased and the necessary surface roughness cannot be assured. On the other hand, if the carbon content of the blank exceeds 0.6 wt %, the machining ability will be substantially reduced and the sensitivity of hardening cracks will be extremely increased.

It is preferred that the blank of the shaft part contains Si of 0.02-0.1 wt %, Cr of 0.02-0.05 wt %, B of 0.0003-0.006 wt %, and the remainder of Fe and unavoidable impurities.

Generation of oxidized scale after induction hardening can be suppress and the surface roughness can be improved by properly selecting amounts of Si and Cr in carbon steel liable to form oxides. Element Si is added as a deoxidizer in steel making. If the content of Si is less than 0.02 wt %, sufficient deoxidizing effect cannot be obtained. If the content of Si exceeds 0.1 wt %, the scale film will be thick, the surface roughness will increase and the rolling ability will be reduced. Element Cr is preferably smaller. However since it is inevitably mingled in steel making steps, 0.05 wt % is set as its upper limit. Similar to Si, decrease of Cr improves machining ability. Elements Si and Cr improve the induction hardening ability. Addition of B of 0.0003-0.006 wt % can compensate for decrease of Si and Cr. If the addition of B is less than 0.0003 wt %, it cannot exhibit effect in improvement of hardening ability. If the addition of B exceeds 0.006 wt %, coarsening of crystal grains is generated. Thus, the sensitivity of hardening cracks is promoted. The amount of addition of B is preferably 0.0004-0.005 wt %.

It is preferable that the old austenite grain size of the surface of rolling groove 5 after the induction hardening is #8-11. If the old austenite grain size of the surface of rolling groove 5, after the induction hardening, is smaller than #8, oxidized scale will be extremely increased, the surface roughness will be extremely worse and the deflection will also be increased. If the old austenite grain size of the surface of rolling groove 5, after the induction hardening, is larger than #11, the effective hardened depth will be decreased.

Shown below in Table 1 is a manufacturing method of the screw shaft of the prior art (A) and a manufacturing method of the screw shaft of the present disclosure (N). Table 2 is a comparison of the characteristics between the screw shaft manufactured by the prior art and those of embodiments 1-4 of the prior art.

The screw shaft of the prior art was manufactured in accordance with the manufacturing method of the prior art (A). A blank of S53C rolled steel "as is" was used, improving the accuracy of the dimension and the surface characteristics by centerless grinding the blank after straightening, performing a rolling process, and finally performing induction hardening in the ambient atmosphere. The outer diameter of the rolling groove portion is φ15.

Screw shafts of the embodiments 1-3 of the prior art were manufactured in accordance with the manufacturing method of the present disclosure (N). Blanks of S53C rolled "as is" were used improving the accuracy of dimension and the surface characteristics by centerless grinding the blanks after their straightening, performing rolling process to form a rolling groove, and finally performing moving induction hardening in oil. The blank of the embodiment 4 was spheroidizing annealed. The outer diameter of the rolling groove portion of each of the embodiments 1-4 is φ8, φ29, φ15 and φ15 respectively.

As shown in Table 2, the thickness of oxidized scale in the screw shaft of the prior art is 0.003 mm. The thickness of the screw shaft of each of the embodiments 1-4 is extremely thin such as 50, 170, 70 and 60 nm respectively and exhibit the same color as steel of the entire base metal.

The thickness of the oxidized scale can easily be measured by the Auger spectroscopy apparatus. The component analysis of the surface of the rolling groove was performed by the Auger spectroscopy. Only oxygen and iron of the components forming the surface were extracted. The increasing depth was investigated from the oxygen concentration of the base metal to determine the thickness of oxidized scale.

With respect the embodiment 1, the specific deflection amount was large since the shaft diameter is small, such as φ8, although the thickness of oxidized scale is extremely thin. With respect to the embodiment 2, the heating efficiency in oil was worse since the shaft diameter is large, such as φ29, and thus the thickness of oxidized scale was large.

In addition with respect to the embodiments 3 and 4, the thickness of oxidized scale was small and the specific deflection amount was also small. In embodiment 4 where spheroidizing annealing treatment was performed in the rolling process, the deflection after induction hardening in oil was reduced less than that of the embodiment 3.

As described above it is possible according to the present disclosure to provide a shaft part, formed with a rolling groove, that is bright annealed after induction hardening. Thus, this can eliminate any scale removing treatment, reduce the generation of deflection, and the surface of the induction hardened rolling groove can be used "as is". Thus, the productivity and manufacturing cost can be improved.

TABLE 1

| Method | Blank | Turning | Centerless grinding | Rolling process |
|---|---|---|---|---|
| A | Coil | Done | Done | Done |
| N | Coil | Done | Done | Done |

| Method | Moving induction hardening | Straightening | Buffing | Outer circumference grinding |
|---|---|---|---|---|
| A | In atmosphere | Done | Done | Done |
| N | In oil | Done | Not done | Done |

TABLE 2

| Article | Used steel | Blank spec. | Outer diameter | Method |
|---|---|---|---|---|
| Prior art | S53C | Rolled as it is | φ15 | A |
| Embodiment 1 | S53C | Rolled as it is | φ8 | N |
| Embodiment 2 | S53C | Rolled as it is | φ29 | N |
| Embodiment 3 | S53C | Rolled as it is | φ15 | N |
| Embodiment 4 | S53C | Spheroidizing annealing | φ15 | N |

| Article | Deflection (TIR/overall length) ($\times 10^{-3}$) | | Ratio of effective hardened depth | Thickness of scale After heat treatment | Remarks |
|---|---|---|---|---|---|
| | After heat treatment | After correction | | | |
| Prior art | 1.2 | 0.7 | 0.30 | 3000 nm (3 μm) | Scale remained after buffing |
| Embodiment 1 | 2.5 | 1.7 | 0.40 | 50 | Dimensional variation of rolling groove increased after rolling |
| Embodiment 2 | 0.7 | 0.4 | 0.18 | 170 | |
| Embodiment 3 | 0.9 | 0.5 | 0.25 | 70 | |
| Embodiment 4 | 0.85 | 0.45 | 0.23 | 60 | |

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The shaft part formed with a rolling groove of the present disclosure can be applied to various kinds of shaft part formed with a rolling groove such as a screw shaft of a ball screw, a spline shaft of a ball spline etc.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A shaft part, formed with a rolling groove on which rolling elements roll, comprising:
    at least the rolling groove is induction hardened and has no generation of black colored oxidized scale after the induction hardening, a surface of the induction hardened rolling groove is used, as a rolling surface immediately after the induction hardening process;
    the shaft part is carbon steel including carbon content of 0.47-0.6 wt % and Si of 0.02-0.1 wt %, Cr of from 0.02 to <0.05 wt %, B of 0.0003-0.006 wt %;
    surface roughness Ra of the induction hardened surface, of the rolling groove, immediately after the induction hardening process, is less than 1.0, and a ratio of effective hardened depth of a hardened layer is about 0.15 to about 0.45.

2. The shaft part formed with a rolling groove of claim 1, wherein the rolling groove has a circular arc cross-section and the rolling elements are balls.

3. The shaft part formed with a rolling groove of claim 1, wherein the shaft part is a screw shaft of a ball screw.

4. The shaft part formed with a rolling groove of claim 3, wherein the screw shaft is one having a rolling groove formed by a rolling process.

5. The shaft part formed with a rolling groove of claim 4, wherein a heat softening treatment is performed just before pre-machining rolling of the groove.

6. The shaft part formed with a rolling groove of claim 5, wherein the specific deflection amount (deflection amount/overall length) of shaft deflection is $1.05 \times 10^{-3}$ (TIR/mm) or less after induction hardening and $0.6 \times 10^{-3}$ (TIR/mm) or less after straightening.

7. The shaft part formed with a rolling groove of claim 6, wherein the outer diameter of the rolling groove portion forms an outermost diameter of the shaft part and the outermost diameter of the shaft part is within a range of φ10-φ28.

8. The shaft part formed with a rolling groove of claim 1, further including a surface hardness of HRC 46-64 of the rolling groove after the induction hardening.

9. The shaft part formed with a rolling groove of claim 8, wherein the blank of the shaft part contains the remainder of Fe and unavoidable impurities.

10. The shaft part formed with a rolling groove of claim 9, wherein old austenite grain size of the surface of rolling groove after the induction hardening is #8-11.

11. The shaft part formed with a rolling groove of claim 1, wherein both ends of the shaft part are incorporated with ball bearings.

12. The shaft part formed with a rolling groove of claim 1, wherein both ends of the shaft part are incorporated with needle bearings.

13. The shaft part formed with a rolling groove of claim 1, wherein the shaft part has the rolling groove where rolling elements roll and at least the surface of the rolling groove is moving induction hardened in oil.

* * * * *

UNITED STATES PATENT AND TRADEMARK OFFICE
CERTIFICATE OF CORRECTION

PATENT NO. : 8,573,081 B2  Page 1 of 1
APPLICATION NO. : 13/278208
DATED : November 5, 2013
INVENTOR(S) : Hiroyuki Uchida

It is certified that error appears in the above-identified patent and that said Letters Patent is hereby corrected as shown below:

In the Specifications

Column 6
Line 13      "$0.6\times10^{-3}$(TIR/mm)" should be --$0.6\times10^{-3}$ (TIR/mm)--
Line 19      "$1.05\times10^{-3}$(TIR/mm)" should be --$1.05\times10^{-3}$ (TIR/mm)--

Column 9
Line 55      after "oil", delete ","

Signed and Sealed this
Fourth Day of March, 2014

Michelle K. Lee
*Deputy Director of the United States Patent and Trademark Office*